US006676323B2

(12) United States Patent
Oen

(10) Patent No.: US 6,676,323 B2
(45) Date of Patent: Jan. 13, 2004

(54) ADJUSTABLE CLAMPING DEVICE IN A MECHANICAL PRESS

(75) Inventor: Richard J. Oen, Wapakoneta, OH (US)

(73) Assignee: The Minster Machine Company, Minster, OH (US)

( * ) Notice: Subject to any disclaimer, the term of this patent is extended or adjusted under 35 U.S.C. 154(b) by 60 days.

(21) Appl. No.: 09/750,751

(22) Filed: Dec. 29, 2000

(65) Prior Publication Data

US 2002/0085878 A1 Jul. 4, 2002

(51) Int. Cl.[7] ............................................ F16D 11/06
(52) U.S. Cl. .............................. 403/31; 403/37; 403/38
(58) Field of Search .............................. 403/31, 26, 34, 403/35, 36, 37, 38, 39, 55, 362, 395

(56) References Cited

U.S. PATENT DOCUMENTS

| | | | | | |
|---|---|---|---|---|---|
| 2,093,281 | A | | 9/1937 | Kreuser | |
| 4,093,052 | A | | 6/1978 | Falk | |
| 4,410,169 | A | | 10/1983 | Swenson | |
| 4,577,389 | A | * | 3/1986 | Shultz | 29/568 |
| 4,785,732 | A | | 11/1988 | Czapka et al. | |
| 4,923,320 | A | | 5/1990 | Klischat | |
| 4,998,841 | A | * | 3/1991 | Wilde | 403/362 X |
| 5,090,279 | A | * | 2/1992 | Enzinger | 82/152 |
| 5,154,074 | A | * | 10/1992 | Haraguchi et al. | 406/37 S |
| 5,307,709 | A | | 5/1994 | Bareis et al. | |
| 5,865,070 | A | | 2/1999 | Bornhorst et al. | |
| 6,390,424 | B1 | * | 5/2002 | Kidushim et al. | 403/55 X |

FOREIGN PATENT DOCUMENTS

| | | |
|---|---|---|
| DE | 4219405 | 6/1992 |
| EP | 0 116 799 A1 | 8/1984 |
| EP | 1 138 958 A2 | 10/2001 |
| GB | 2307199 | 5/1997 |

* cited by examiner

*Primary Examiner*—John R. Cottingham
(74) *Attorney, Agent, or Firm*—Randall J. Knuth

(57) ABSTRACT

An adjustable clamping mechanism includes a slider block annularly disposed about a rod device within a mechanical press. The mechanism utilizes a press or interference fit connection between the components. During operation, high-pressure oil is injected into the location between the slider block and rod, thereby relieving the press fit and making it possible to have relative movement therebetween. An actuator causes selective linear displacement of the slider block along the longitudinal axis of the stationary rod during the release condition. Once the slider block is repositioned, the high-pressure oil is removed, which reactivates the press fit connection and causes the slider block to once again lock up against the rod and prevent movement therebetween.

38 Claims, 8 Drawing Sheets

ADJUSTABLE CLAMPING DEVICE IN A MECHANICAL PRESS

BACKGROUND OF THE INVENTION

1. Field of the Invention

The present invention relates to a mechanical press, and, more particularly, to a method and apparatus useful in adjusting press components associated with press fit couplings, such as support structures for rocker arm mechanisms provided in machine drive apparatus.

2. Description of the Related Art

Mechanical presses and other such power delivery machines utilize a drive apparatus to transmit torque between components. Depending upon the press application, it is possible that the drive apparatus may need to be reconfigured to accommodate a different press process or for other suitable reasons. For this reason, it is important that the press machine have the capability to allow adjustments to be made to the drive apparatus. For example, it may be necessary to alter or modify the mechanical relationship of the rocker arm so as to change its effective arm length and hence the torque transmission characteristics.

However, conventional adjustment mechanisms deploy a manual procedure involving movement of the rocker arm support between a limited number of discrete locations. The support element typically is secured using a removable key that is inserted into the support element and then received within a stationary fastening insert or hole to lock it in place. To effect movement, the key is removed and the support element is repositioned, but only to another keying location where the key channel of the support element is in alignment or registration with another stationary fastening insert.

What is therefore needed is an adjustment mechanism capable of executing continuously variable dynamic adjustments.

SUMMARY OF THE INVENTION

In one form of the invention, a combination includes an adjustable clamping device normally clamped to a support member in a press fit or interference fit connection. The combination is adapted to enable the press fit connection to be selectively releasable. In one form of the combination, the clamping device includes a slider block annularly disposed about a bar or rod apparatus. During a normal state, the slider block is clamped circumferentially about the rod in a press fit or interference engagement that defines a locking condition for preventing relative movement between the slider block and rod.

A hydraulic release mechanism injects a high pressure fluid into the interface (e.g., interstitial spacing) between the slider block and rod to effectuate a radially outward displacement of the slider block relative to the rod. This hydraulically-actuated displacement is sufficient to temporarily relieve the normal press fit or interference fit connection and thereby allow the slider block to be moved linearly with respect to the relatively stationary rod. In particular, the slider block undergoes a displacement along the longitudinal axis of the rod.

After the slider block reaches its new position, the pressurization is removed in order to reestablish and otherwise restore the previous press fit connection and once again lock the slider block against the rod.

The adjustable clamping device finds particular use in environments such as mechanical presses where the slider block functions as a support structure that serves as the pivot attachment point for carrying a rocker arm. In such a configuration, any linear adjustment of the slider block relative to the rod will likewise change the absolute positioning of the rocker arm within the press drive apparatus and thereby adjust its effective driving length, which in turn varies the torque communicating relationship between the rocker arm and the press driven component. Various other mechanical couplings or machine linkages can be similarly adjusted.

The invention, in one form thereof, is directed to an assembly comprising, in combination, a first member and a second member releasably connectable with one another. A mechanism is provided to selectively release the connection between the first member and the second member. An actuator selectively causes relative linear movement between the first member and the second member, when release of the connection exists. The releasable connection between the first member and the second member is defined in one form by a press fit connection therebetween.

The mechanism is operative further to selectively restore the releasable connection between the first member and the second member, following relative movement therebetween.

The mechanism is operative to selectively pressurize an interface defined between the first member and the second member. In particular, the mechanism is operative to perform at least one of selectively applying hydraulic pressure to the interface to enable release of the connection between the first member and the second member, and selectively withdrawing hydraulic pressure from the interface to enable restoration of the releasable connection between the first member and the second member.

The mechanism, in one form, includes at least one fluid passageway formed in the first member, at least one fluid passageway formed in the second member, or a combination thereof, wherein each fluid passageway is suitably arranged to enable hydraulic communication with the interface.

In one form of the assembly, the first member includes a rod element and second member includes a slidable element annularly disposed at least in part about the rod element. The slidable element is displaced axially along the rod element upon activation of the actuator.

The invention, in another form thereof, is directed to a combination comprising a first device and a second device arranged in releasable press fit engagement with one another. The combination further includes a first means to selectively release, at least in part, the press fit engagement between the first device and the second device; and a second means to selectively cause relative linear movement between the first device and the second device, when release of the press fit engagement exists.

The first means is operative further to restore the releasable press fit engagement between the first device and the second device, following relative movement between the first device and the second device.

The first means, in one form, further includes a pressure means to selectively pressurize an interface defined between the first device and the second device. In particular, the pressure means is operative to perform at least one of selectively applying hydraulic pressure to the interface to enable release of the press fit engagement, and selectively withdrawing hydraulic pressure from the interface to enable restoration of the releasable press fit engagement.

In one form, the pressure means includes a source of selectively variable hydraulic pressure. The pressure means also includes at least one fluid passageway formed in at least one of the first device and the second device, wherein each fluid passageway is suitably arranged to enable fluid communication with the interface.

The second means further includes, in one form, a control apparatus to automatically adjust the relative position of the first device and the second device, in response to release of the press fit engagement.

In one form of the combination, the first device includes a rod member and the second device includes a slidable member annularly disposed at least in part about the rod member. The slidable member moves axially along the rod member upon activation of the second means.

The invention, in another form thereof, is directed to an assembly comprising, in combination, a support member, a movable member releasably connected to the support member, a mechanism to selectively release the connection between the movable member and the support member, and an actuator to selectively linearly move the movable member relative to the support member, while the movable member is operatively released from the support member.

The releasable connection between the support member and the movable member is preferably defined by a press fit engagement therebetween.

The mechanism is operative further to selectively restore the releasable connection between the movable member and the support member, following movement of the movable member relative to the support member.

The mechanism, in one form, is operative to selectively pressurize an interface defined between the support member and the movable member. In particular, the mechanism is operative to admit pressurized fluid into the interface to enable release of the connection between the movable member and the support member, and to remove pressurized fluid from the interface to enable restoration of the releasable connection between the movable member and the support member.

The actuator, in one form, includes a threaded member operatively associated with the movable member, such threaded member being arranged in adjustable threading engagement with a threaded surface formed in the movable member. A device is provided to activate the threaded member.

The device, in one form, includes a controllable motor-gear combination operatively coupled to the threaded member.

The invention, in another form thereof, is directed to an assembly comprising, in combination, a carriage member and a slidable clamping device arranged in releasable clamping relationship to the carriage member, with an interface defined therebetween. A mechanism selectively releases the clamping relationship between the clamping device and the carriage member. A means is provided to selectively move the clamping device relative to the carriage member, while the clamping device is released from the carriage member.

The releasable clamping relationship between the carriage member and the clamping device is preferably defined by a press fit connection therebetween.

The mechanism is operative further to selectively restore the releasable clamping relationship between the clamping device and the carriage member, following movement of the clamping device relative to the carriage member.

The mechanism, in one form, is operative to selectively pressurize the interface. In particular, the mechanism is operative to perform at least one of selectively applying hydraulic pressure to the interface to enable release of the clamping device from the carriage member, and selectively withdrawing hydraulic pressure from the interface to enable restoration of the releasable clamping relationship between the clamping device and the carriage member.

The movement means, in one form, further includes an actuator to displace the clamping device along an axis of the carriage member.

The invention, in yet another form thereof, is directed to an assembly comprising, in combination, a rod member and a slidable member annularly disposed at least in part about the rod member and defining an interface therewith. The slidable member is arranged in releasable press fit connection with the rod member. A mechanism is provided to selectively release, at least in part, the press fit connection between the slidable member and the rod member. A controller is provided to selectively move the slidable member relative to the rod member, following release of the slidable member from the rod member.

The mechanism is operative further to selectively restore the releasable press fit connection between the slidable member and the rod member, following movement of the slidable member relative to the rod member.

In one form, the mechanism is operative to selectively pressurize the interface. In particular, the mechanism is operative to perform at least one of selectively applying hydraulic pressure to the interface to enable release of the press fit connection between the slidable member and the rod member, and selectively withdrawing hydraulic pressure from the interface to enable restoration of the releasable press fit connection between the slidable member and the rod member.

The controller, in one form, is operative to axially displace the slidable member along the rod member.

The invention, in yet another form thereof, is directed to a method for use with a combination comprising a support member and a movable device arranged in releasable press fit connection with the support member. The method includes the steps of releasing the press fit connection between the movable device and the support member, and linearly moving the movable device relative to the support member, during release of the press fit connection.

The releasing step further includes the step of pressurizing an interface defined between the support member and the movable device, such as by selectively applying a hydraulic pressure to the interface. The method further includes the step of restoring the releasable press fit connection between the support member and the movable device, following movement of the movable device, such as by selectively withdrawing hydraulic pressure from the interface.

The invention, in still yet another form thereof, is directed to a method to control a machine combination, wherein such machine combination includes a support member and a movable device arranged in releasable press fit connection with the support member and defining an interface therewith.

The control method includes the steps of pressurizing the interface to release the press fit connection between the movable device and the support member, and linearly moving the movable device relative to the support member, during release of the press fit connection. The pressurizing step further includes, in one form, the step of selectively applying a hydraulic pressure to the interface.

The method further includes the step of restoring the releasable press fit connection between the support member and the movable device, following movement of the movable device, such as by reducing the pressurization of the interface.

The invention, in still yet another form thereof, is directed to a method for use with a combination comprising a first member and a second member arranged in releasable press fit connection with one another. The method includes the steps of releasing the press fit connection between the first member and the second member, and actuating relative linear movement between the first member and the second member, during release of the press fit connection.

The releasing step further includes in one form the step of pressurizing an interface defined between the first member and the second member, such as by selectively applying a hydraulic pressure to the interface. The method further includes in one form the step of restoring the releasable press fit connection between the first member and the second member, following the relative movement therebetween, such as by selectively withdrawing hydraulic pressure from the interface.

One advantage of the invention is that dynamic, in-process adjustments can be made to the slider block throughout the entire press running cycle without any need to suspend the press operation.

Another advantage of the invention is that such on-the-fly adjustments to the slider block location enable the rapid execution of changes to the drive apparatus in response to new press conditions or parameters, such as varying the effective drive length of the rocker arm.

Another advantage of the invention is that an infinite number of continuously variable adjustment positions can be obtained for the slider block, unlike conventional arrangements where only a finite set of discrete block locations are possible.

Another advantage of the invention is that the adjustment mechanism may be operated at any time before, during, and after press operation.

Another advantage of the invention is that the adjustment process may be executed automatically, namely, the actuator is automatically activated to displace the slider block in response to an indication that the press fit connection has been released.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
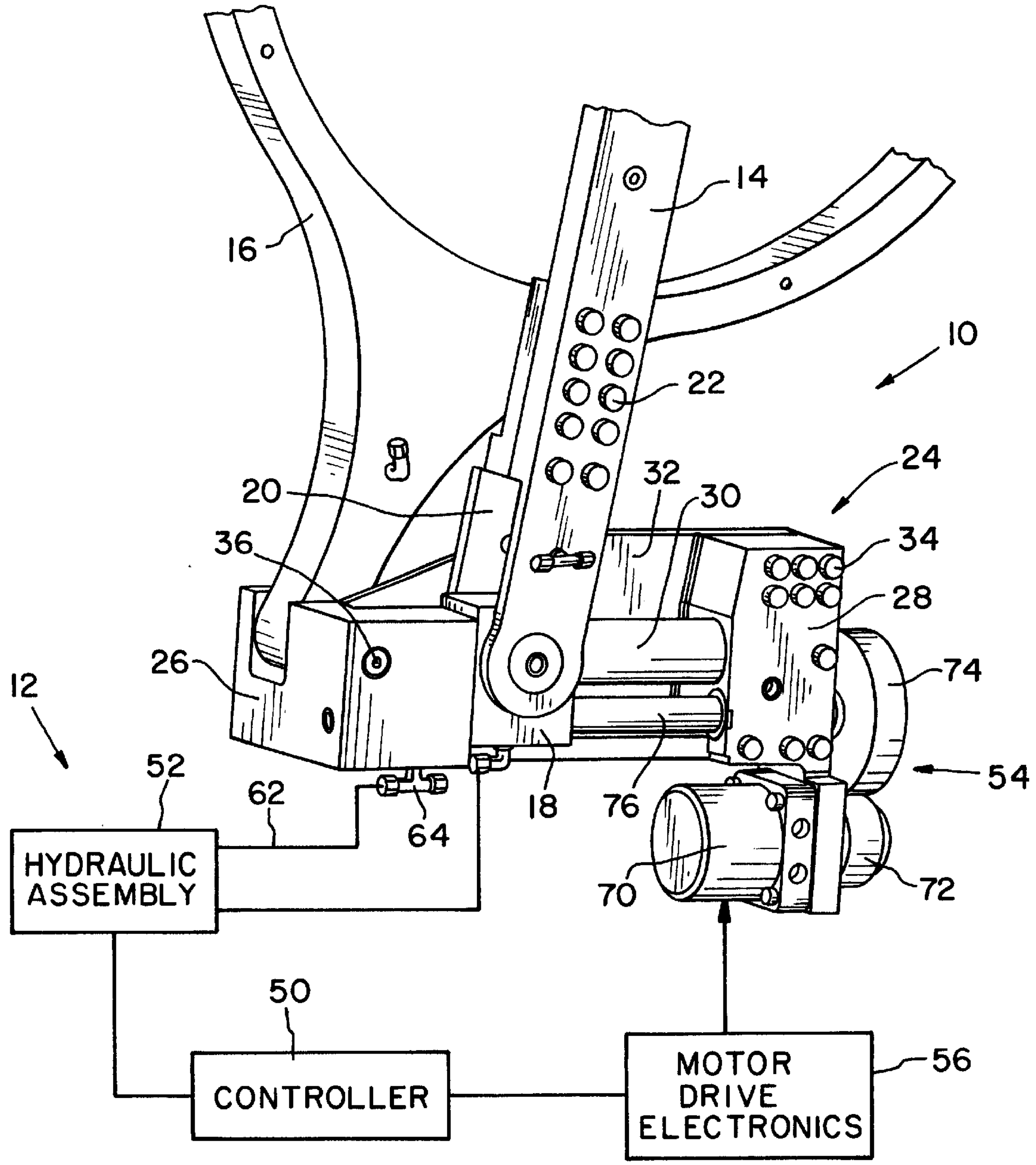
FIG. 1 is a partial block diagram/schematic showing a front-side, forward-end, elevational perspective view of a machine combination employing the adjustment mechanism of the present invention.

Referring now to the drawings and particularly to FIG. 1, there is shown a partial block diagram, schematic perspective view of a machine combination (illustrated generally at 10) employing an adjustment mechanism (illustrated generally at 12), in accordance with one embodiment of the present invention.

Figure 2:
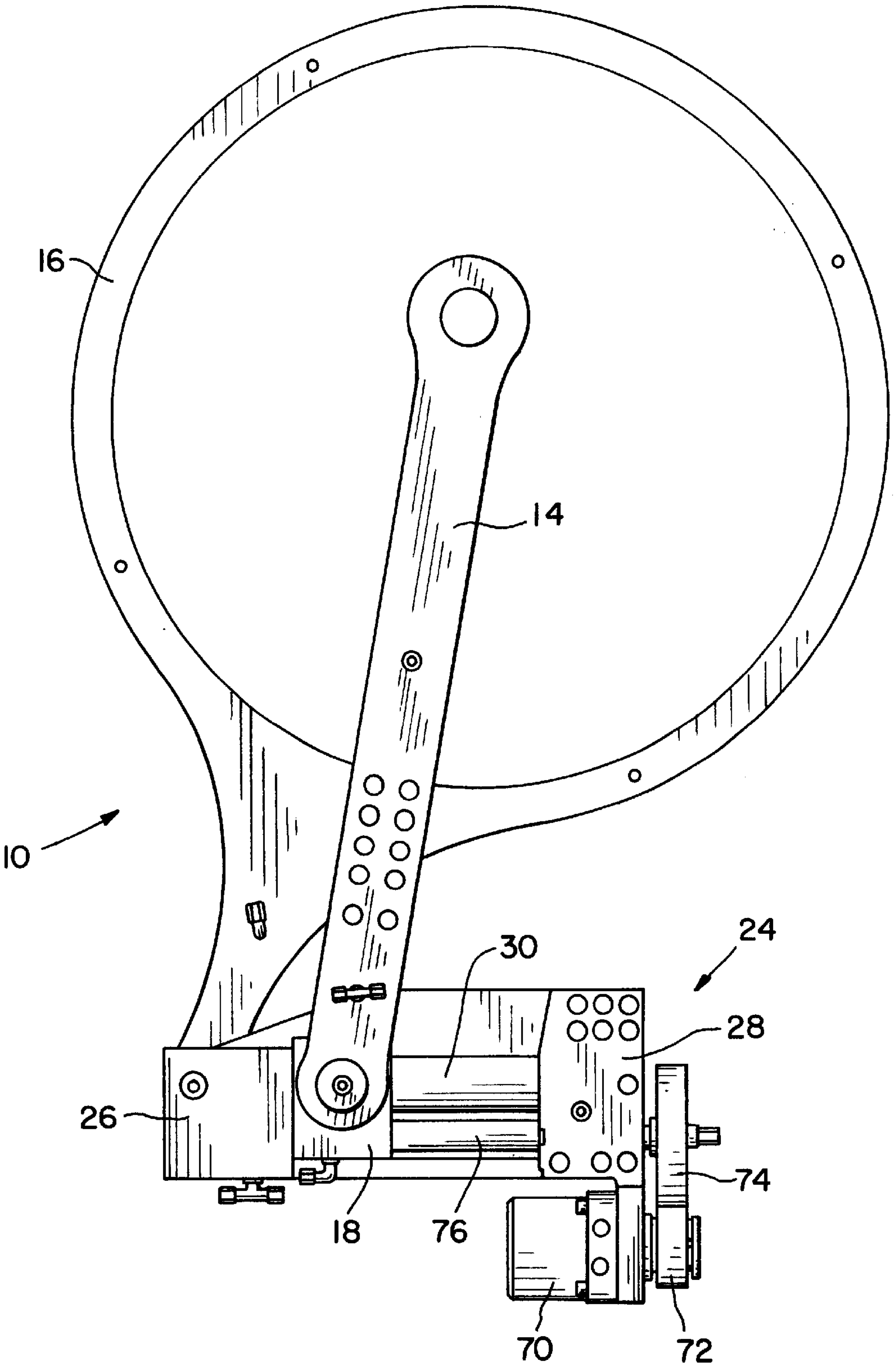
FIG. 2 is a schematic showing a front-side, planar view of the machine combination illustrated in FIG. 1.
Figure 3:
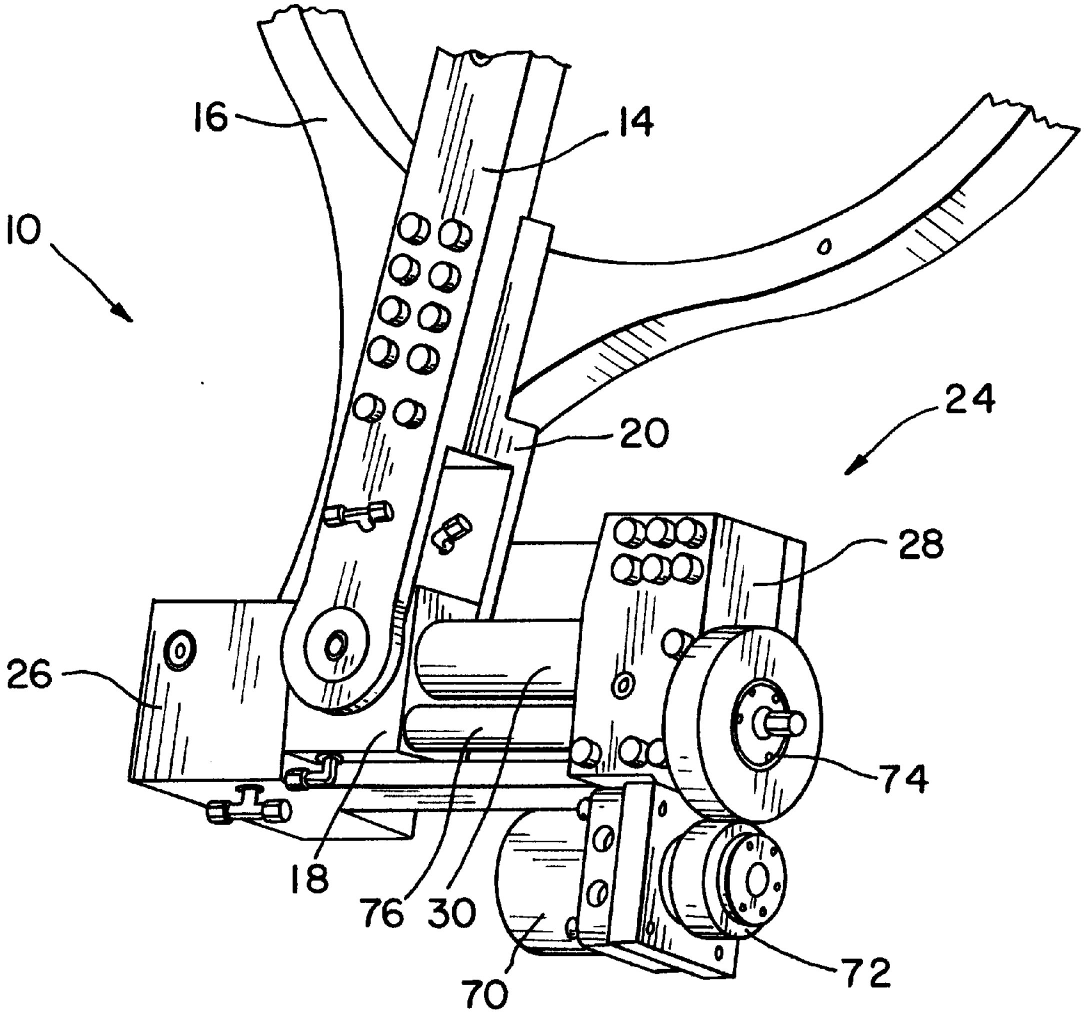
FIG. 3 is a partial schematic showing a front-side, rearward-end, elevational perspective view of the machine combination illustrated in FIG. 1.
Figure 4:
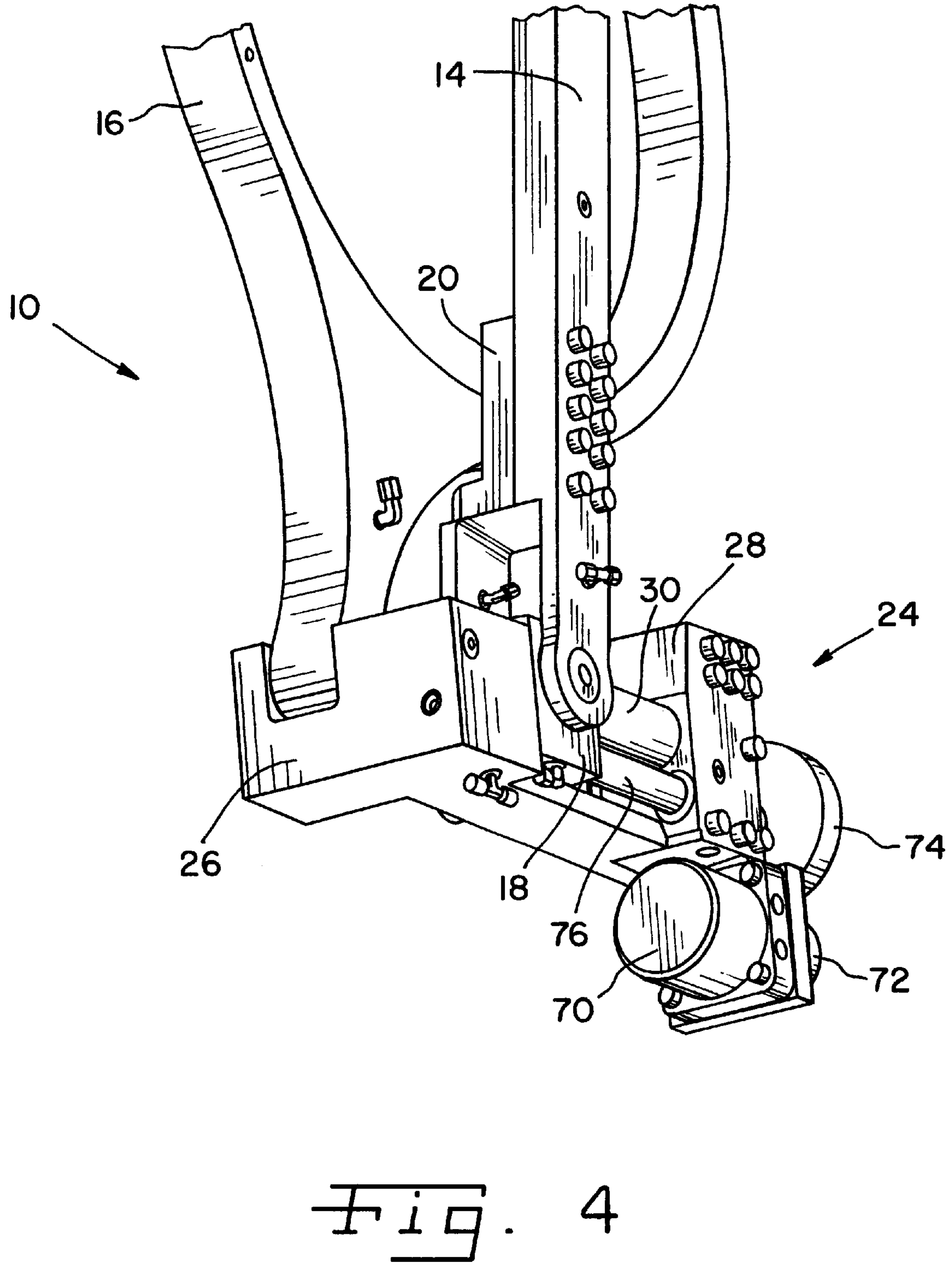
FIG. 4 is a partial schematic showing a front-side, forward-end, bottom elevational perspective view of the machine combination illustrated in FIG. 1.
Figure 5:
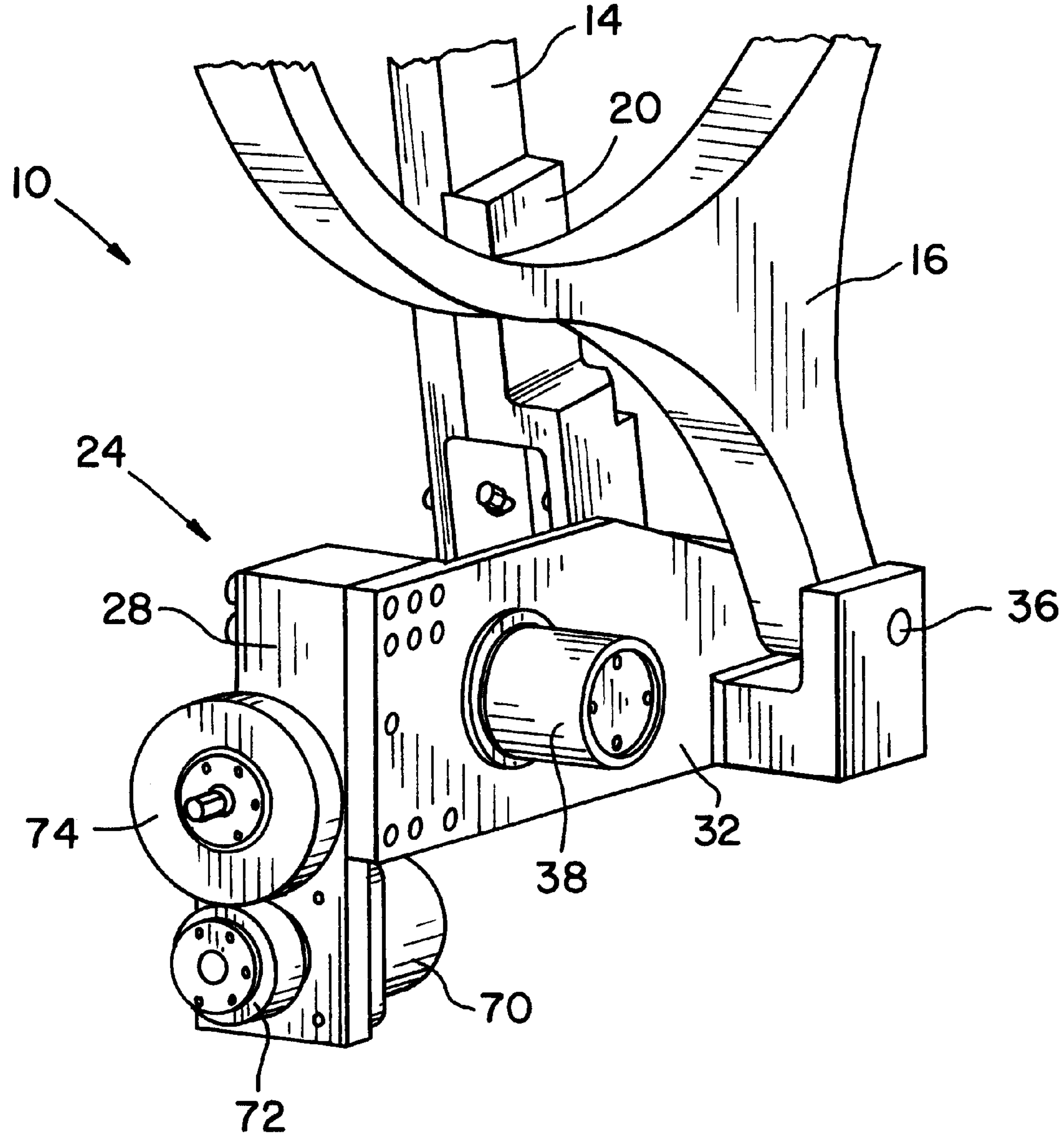
FIG. 5 is a partial schematic showing a back-side, rearward-end, elevational perspective view of the machine combination illustrated in FIG. 1.
Figure 6:
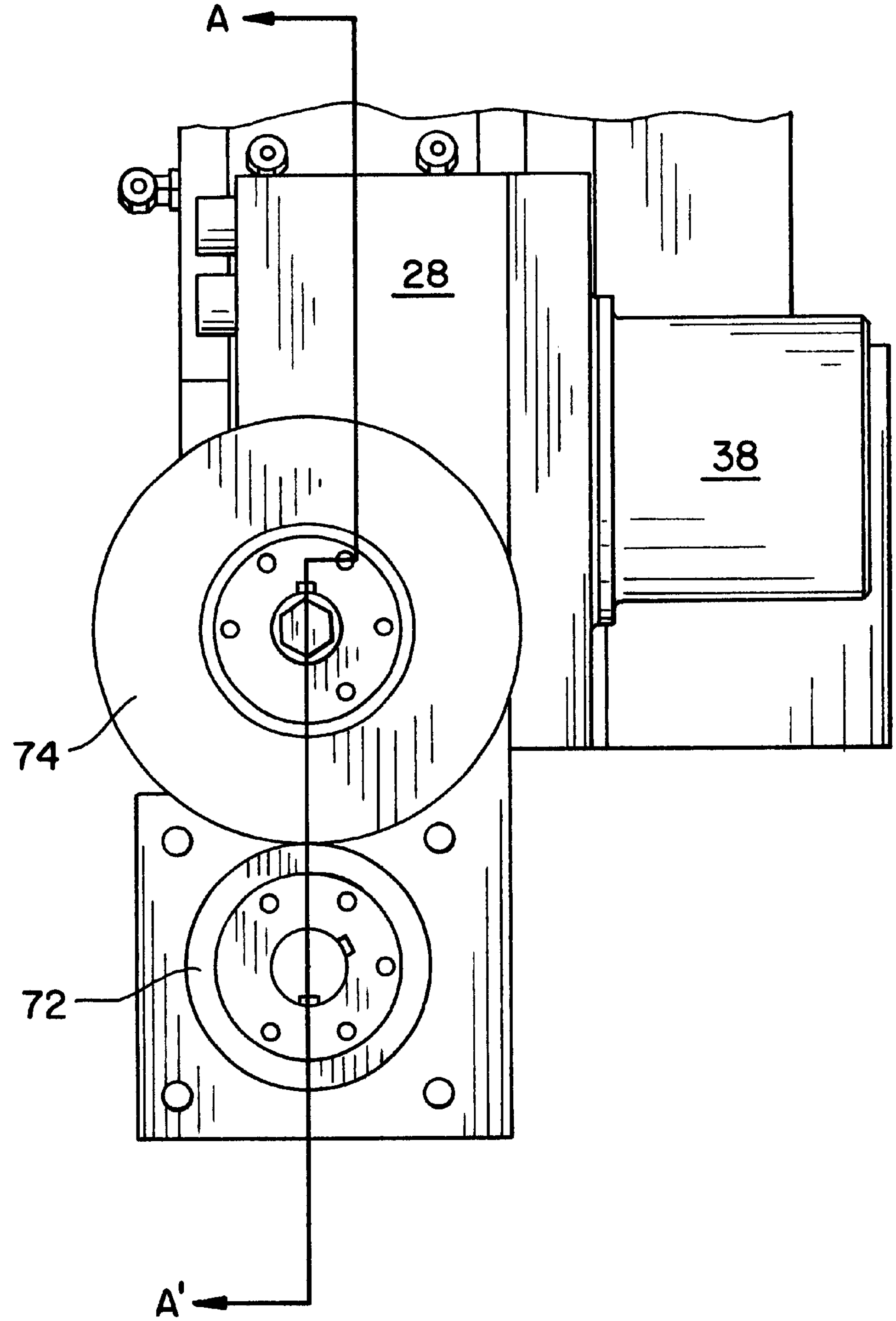
FIG. 6 is a partial schematic showing a rearward-end, axial plane view of the machine combination illustrated in FIG. 1.

Referring to FIG. 1 in conjunction with FIG. 2, the illustrated machine combination 10 preferably forms part of a mechanical press and includes a drive arm or linkage 14 (e.g., press rocker arm). Drive arm 14 is coupled at an upper drive end to a press driven component 16 (e.g., eccentric gear)in the indicated eccentric driving relationship, for example. Drive arm 14 is pivotally coupled at a lower support end to an adjustable slider block or movable device 18. The pivoting connection between drive arm 14 and slider block 18 is facilitated with an attachment link 20 fixedly secured at an upper end to drive arm 14 using screws 22 and pivotingly coupled at a lower end to slider block 18.

Press component 16 and rocker arm 14 are supported by a housing assembly generally illustrated at 24, which includes a forward-end housing unit 26 and a rearward-end housing unit 28 arranged in spaced-apart relationship. Housing units 26 and 28 are coupled to one other using a shaft or rod apparatus 30 extending between them. The rod apparatus 30 is rigidly, fixedly secured at opposite ends to housing units 26 and 28 and therefore is stationary with respect thereto. Press component 16 is pivotally mounted to forward housing unit 26 using pivot pin 36. Housing assembly 24 further includes a backing plate 32 secured to rearward housing unit 28 using screws 34.

The mounting support provided by housing assembly 24 to drive arm 14 and press component 16 is further exemplified in the various views shown in FIGS. 2–5. Referring specifically to the backside view of FIG. 5, the entire machine combination 10 is assembled to the press frame upright using attachment member 38.

Slider block 18 is mounted upon rod 30 in a well-known press fit connection or interference-type engagement. Slider block 18 may similarly be considered to be arranged in a clamping relationship to rod 30. In one form, slider block 18 is annularly disposed about rod 30 to define an interface therebetween at which the press fit connection is established. As known, this press fit or interference fit is defined at the circumferential, peripheral, and/or bearing surfaces of slider block 18 and rod 30.

According to one aspect of the invention, discussed in more detail below, the combination of slider block 18 and support rod 30 is adapted to provide a releasable press fit connection therebetween. In particular, the normal press fit connection may be selectively released such that the inner bearing surface of slider block 18 and the outer bearing surface of support rod 30 become sufficiently disengaged to enable relative motion between slider block 18 and rod 30. In one form, release of the press fit connection may be characterized by the formation of a small radial clearance between the components.

As used herein, this release action is preferably complete (i.e., occurs throughout the entire press fit connection interface), although it should be understood that any degree of disconnection may be accomplished which is sufficient to allow relative movement between slider block 18 and rod 30. For example, some degree of press fit engagement may remain provided that it does not compromise the ability to effectuate relative movement of the components.

According to another aspect of the invention, once the slider block 18 is released from rod 30 and while such release condition is being maintained, slider block 18 is caused to move relative to rod 30. Preferably, the actuated movement involves selective and reversible axial displacement of slider block 18 relative to support rod 30. In particular, slider block 18 is displaced axially along a longitudinal dimension of rod 30. For this purpose, rod 30 remains substantially immovable with respect to slider block 18.

Although the preceding discussion has involved the illustrated machine combination 10, this implementation should not be considered in limitation of the present invention as it should be apparent that the present invention may be used in conjunction with various other assemblies or device arrangements, and deployed in machine environments other than mechanical presses.

Referring now to adjustment mechanism 12 of the present invention shown diagrammatically in FIG. 1, the illustrated adjustment mechanism 12 includes, in combination, a controller 50, a hydraulic assembly 52, an actuator assembly (generally illustrated at 54), and motor drive electronics 56. Controller 50 generally provides operational control of the indicated components to accomplish the main features of the present invention, namely, release of the press fit connection between slider block 18 and support rod 30 (using hydraulic assembly 52) and movement of slider block 18 relative to support rod 30 (using actuator assembly 54 in conjunction with drive electronics 56).

According to one aspect of the present invention, the combination of slider block 18 and rod 30 is adapted to enable the normally static, press fit connection established therebetween to be made selectively releasable. For this purpose, in one implementation, the illustrated hydraulics assembly 52 is used to selectively pressurize the interface defined at the press fit connection between slider block 18 and support rod 30.

Hydraulics assembly 52 preferably includes, in one form thereof, a source of selectively variable high-pressure hydraulic fluid in combination with a controllable valve assembly. These components are adapted to deliver a controllable high-pressure fluid flow sufficient to induce release of the press fit connection, upon admittance into and distribution through the press fit interface. The high pressure fluid is typically in the range, but not limited to, between 7000 p.s.i. and 10,000 p.s.i., and may include oil or any other suitable medium.

Figure 7:
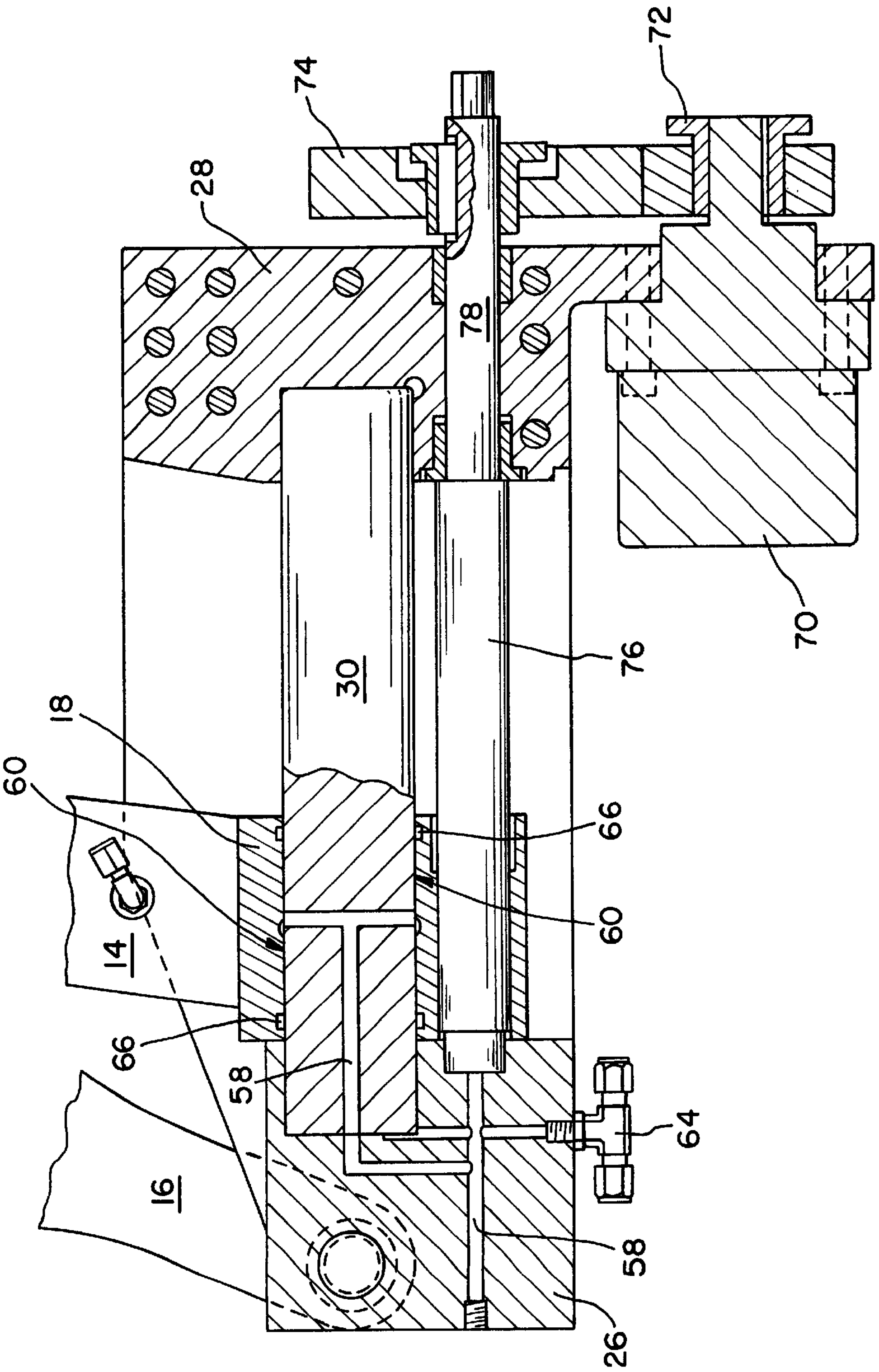
FIG. 7 is a partial schematic showing a front-side, cross-sectional, plane view taken along lines A–A' of FIG. 6, illustrating further a fluid channel configuration for conveying fluid to the press-fit interface, according to another embodiment of the present invention.

For purposes of transporting fluid from hydraulic assembly 52 to the interface between slider block 18 and rod 30, any suitable means may be used to convey the fluid, without limitation. Referring to FIG. 7 in conjunction with FIG. 1, in one preferred form, a fluid channel arrangement is formed, as shown by the combination of fluid supply output line 62, fluid valve/fitting combination 64, and fluid channels 58, to provide fluid communication between the press fit interface region (depicted generally at 60) and hydraulic assembly 52. This fluid communication is facilitated with an intermediate coupling arrangement comprising fluid supply output line 62 and fluid valve/fitting combination 64, which is fluidly coupled via fluid channels 58 to slider block 18.

Seals 66 (FIG. 7) are annularly disposed about rod 30 and interfit within slider block 18 in the indicated manner to define a sealed, fluid tight location or interface 60 capable of being pressurized and then maintaining the pressurization. Any seal arrangement or other suitable means may be used to facilitate the formation of a pressurizable interface between the components. As shown further in FIG. 7, the illustrated radial fluid channels open into interface 60 to enable the delivery of high-pressure fluid thereto, followed by its circumferential distribution about rod 30 to effectuate release of the press fit connection. As known, this pressurization causes circular expansion (i.e., radially outward elastic displacement) of the inner circumferential bearing surface of slider block 18 to thereby define a small radial clearance with rod 30.

The indicated means for delivering fluid to interface 60 (i.e., channels 58) should not be considered in limitation of the present invention as it should be apparent that any other suitable means may be used to provide access to interface 60. For example, the fluid channels may be formed in rod 30. Additionally, any number, arrangement, or configuration of fluid channels may be used.

The illustrated actuator assembly 54 includes, in combination, motor unit 70, pinion 72, gear 74, and adjustable threaded drive screw 76 arranged in cooperating relationship to one another. In a conventional manner, motor 70 is arranged in rotary driving relationship to pinion 72, which is provided in intermeshing gear-driving relationship to gear 74. Gear 74 is arranged in driving connection to screw 76 via intermediate coupling member 78, which may be separate from or integrally formed with screw 76. The combination of components 70, 72, 74, 76, and 78 are attached and otherwise mounted to housing unit 28.

The illustrated drive screw 76 extends from housing unit 28 at one end thereof and is received into a suitable bore formed in slider block 18 at another end thereof. In a preferred form, drive screw 76 is provided with an outer threaded surface that is arranged in threading engagement with a complementary threaded surface formed in the receiving bore of slider block 18. Additionally, the screw 76 is supported at the end opposite the actuator assembly 54 by housing unit 26. The threading engagement between drive screw 76 and slider block 18 is sufficient to enable rotary motion of screw 76 to induce axial displacement of slider block 18 relative to screw 76, under conditions where slider block 18 is free to move and not otherwise prevented from moving, i.e., during release of the press fit connection with rod 30.

In a conventional manner, the rotary motion generated in motor 70 produces simultaneous rotation of pinion 72, which concurrently drives gear 74 via their intermeshing gear arrangement. The driven rotary motion of gear 74 imparts a driving rotation to screw 76, which turns within slider block 18 and imparts a linear displacing force thereto via the threading engagement. The motion of slider block 18 is reversible since a controlled counter-rotation of motor 70 will cause screw 76 to turn in the opposite direction.

Although the illustrated form of actuator assembly 54 includes a cooperating motor-gear combination, this implementation should not be considered in limitation of the present invention as it should be apparent that any means may be used to displace or otherwise actuate movement of slider block 18.

The illustrated motor drive electronics 56 conventionally provide the electronic signals suitable for activating motor 70. Any means well known to those skilled in the art may be used to activate and control motor 70.

The illustrated controller 50 may be implemented in any form suitable to provide operational control of hydraulic assembly 52 and actuator 54 via motor drive electronics 56. For example, controller 50 may include, but is not limited to, a programmable or dedicated computer or microprocessor, logic control circuitry, firmware, software processes, or any combination thereof.

Figure 8:
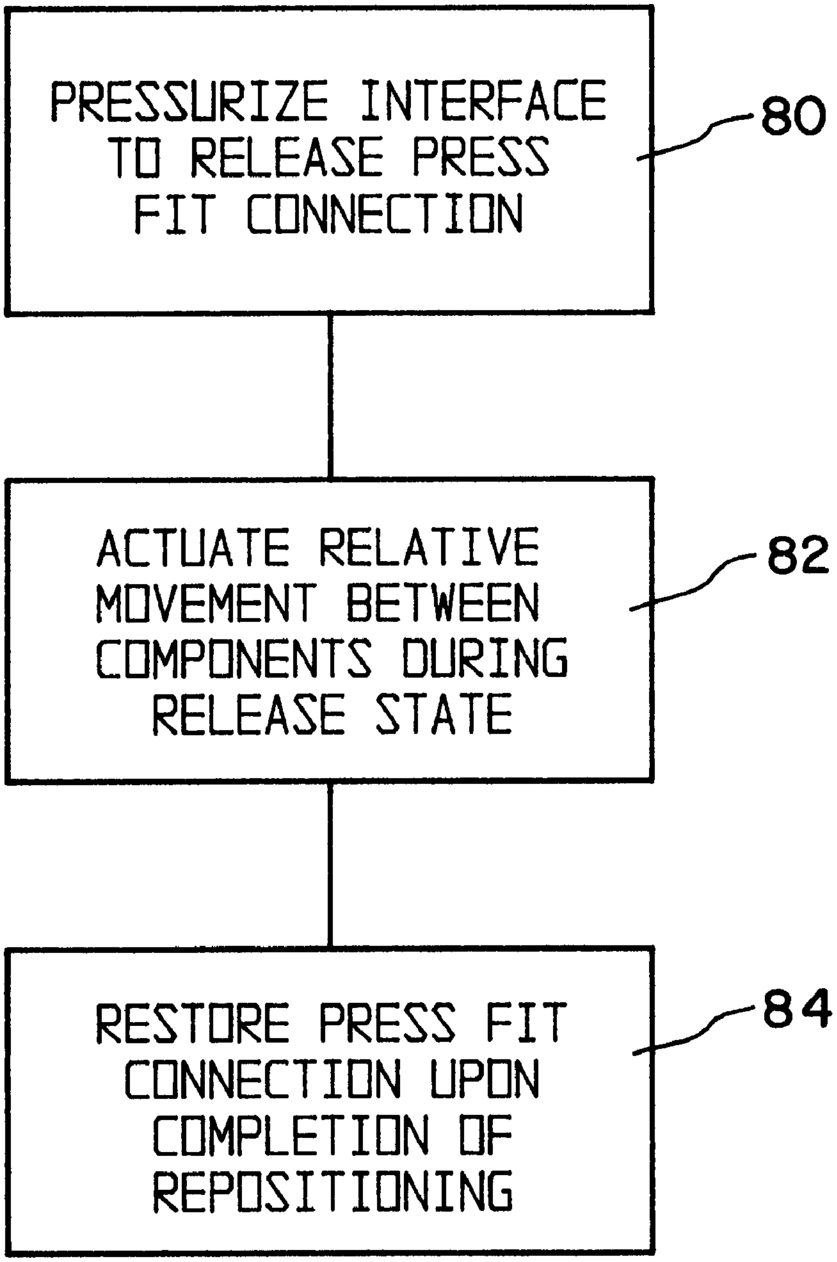
FIG. 8 is a flow diagram illustrating an operating sequence for the adjustment mechanism of FIG. 1, according to the present invention.

Referring now to FIG. 8, during operation, controller 50 receives an instruction or other such command to execute a controllable adjustment to the location of slider block 18. This command may be obtained from any source, such as a manual input from the operator or a signal from a machine monitoring system that detects a condition requiring a new position for the slider block (e.g., a new drive configuration).

The adjustment command will preferably embody or otherwise have a representation of the new location of the slider block. In one alternate form, a database may be provided that maps and otherwise correlates various press conditions or processes to a respective slider block location. In this manner, the controller 50 can simply retrieve from the database the new slider block position using an input press parameter as a key for accessing and searching the database. For example, certain press operating processes may demand certain drive configurations for the rocker arm, which correlate to specific positions for slider block 18 along rod 30.

Controller 50 formulates the control signals sufficient to activate hydraulic assembly 52 and effectively cause release of the press fit connection between slider block 18 and rod 30. As indicated previously, hydraulic assembly 52 in combination with the fluid supply output line 62 (FIG. 1) and fluid channels 58 (FIG. 7) cooperatively function to pressurize the press fit interface or location between slider block 18 and rod 30. (Step 80).

This pressurization, in a preferred form, induces a reversible, radially-outward displacement of slider block 18, at least at its inner bearing surface disposed in opposition to rod 30 where the press fit connection occurs. For this purpose, slider block 18 is made (at least in part) of a material having sufficient resiliency and rigidity to form a tight press fit connection, but also having an elasticity that allows the slider block to expand during pressurization and then eventually return to its original press fit engagement following removal of the pressurization.

As a result of the pressurization, a small radial clearance is established between slider block 18 and rod 30 that allows relative movement between the components. At this point, controller 50 formulates the appropriate control signals for activating actuator assembly 54 in a manner sufficient to move slider block 18 relative to rod 30 in the desired manner. For this purpose, controller 50 may include a processor to assist in performing such signal formulation. Actuator assembly 54 is activated via motor drive electronics 56, which receive the control signals issued from controller 50. (Step 82).

Slider block 18, in its released condition, is then moved linearly with respect to rod 30. In particular, slider block 18 moves axially along the longitudinal dimension of rod 30.

Following activation of the actuator assembly 54, and upon completion of the repositioning of slider block 18, controller 50 issues another set of control signals to hydraulic assembly 52 that are sufficient to appropriately reduce the pressurization being maintained at the interface between slider block 18 and rod 30, thereby restoring the original press fit connection therebetween. As known, this pressure reduction involves withdrawing the hydraulic pressure in a fluid evacuation or exhaustion process, for example. (Step 84).

The control feature of adjustment mechanism 12 is particularly advantageous because it allows continuously variable, dynamic adjustments to be made to the relative position of slider block 18 and rod 30 throughout the entire press running cycle. Notably, the adjustments are executed on an in-process basis characterized by on-the-fly repositioning as the press operation is occurring. Additionally, any linear displacements to slider block 18 are selectively reversible using the appropriate control commands from controller 50. In particular, slider block 18 can be selectively moved along rod 30 in either axial direction at any time. The mechanism also allows a highly precise maneuvering or relocation of slider block 18 due to the operational precision and stability afforded by controller 50 and actuator assembly 54, especially with computer-based or microprocessor-based implementations.

What has been shown and described herein, in one preferred form, is an adjustable clamping mechanism that includes a slider block annularly disposed about a rod device or round bar member within a mechanical press. The mechanism utilizes a press fit connection between the components. During operation, high-pressure oil is injected into the location between the slider block and rod, thereby relieving the press fit and making it possible to have relative movement therebetween. An actuator causes selective linear displacement of the slider block along the longitudinal axis of the stationary rod during the release condition. Once the slider block is repositioned, the high-pressure oil is removed, which reactivates the press fit connection and causes the slider block to once again lock up against the rod and prevent movement therebetween.

It should be understood that the present invention may be used in combinations, arrangements, or systems where the type of interaction or engagement between respective components, devices, or members includes, but is not limited to, a press fit, interference fit, retentive action, grasping action, clamping action, or holding action, whether established in full or in part over the relevant interface.

Furthermore, although the preferred implementation involves movement of slider block 18 relative to stationary rod 30, this should not be considered in limitation of the present invention. Rather, the present invention should be understood as encompassing any relative movement between slider block 18 and stationary rod 30, whether by movement of slider block 18 relative to rod 30, movement of rod 30 relative to slider block 18, or a combination thereof.

Additionally, while linear displacement of slider block 18 along rod 30 is contemplated (i.e., movement of slider block 18 is actuated axially along the longitudinal dimension of rod 30), it is also possible within the scope of the invention that motion may be actuated in a curvilinear or rectilinear fashion, such as in configurations where the element represented by rod 30 has other than a right-cylindrical or shaft-like geometry.

Moreover, although the preferred implementation involves release of the press fit connection via a radially outward elastic displacement of the bearing surface of slider block 18 (accompanied by substantially no radial displacement of rod 30), it should be understood that the release condition may also be accomplished with a radially inward elastic displacement of the bearing surface of support rod 30 occurring alone or in combination with a radially outward elastic displacement of the bearing surface of slider block 18. For this purpose, the fabrication materials, geometry, and construction of rod 30 and slider block 18 will be selected to accommodate the type of release action.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An assembly, comprising:

a housing;

a first member mounted fixedly, said first member being fixed to said housing;

a second member, said first member and said second member being releasably connectable with one another;

a mechanism to selectively release the connection between said first member and said second member, said mechanism being hydraulicly actuated to achieve connection release; and an actuator to selectively cause relative linear movement between said first member and said second member, when release of the connection exists.

2. The assembly as recited in claim 1, wherein the releasable connection between said first member and said second member being defined by a selectively-releasable press fit connection therebetween.

3. The assembly as recited in claim 1, wherein said mechanism being operative further to selectively restore the releasable connection between said first member and said second member, following relative movement therebetween.

4. The assembly as recited in claim 1, wherein said mechanism being operative to selectively pressurize an interface defined between said first member and said second member.

5. The assembly as recited in claim 4, wherein said mechanism further comprises:

at least one fluid passageway formed in said first member, at least one fluid passageway formed in said second member, or a combination thereof, each fluid passageway being arranged to enable hydraulic communication with said interface.

6. The assembly as recited in claim 4, wherein said mechanism being operative to perform at least one of selectively applying hydraulic pressure to said interface to enable release of the connection between said first member and said second member, and selectively withdrawing hydraulic pressure from said interface to enable restoration of the releasable connection between said first member and said second member.

7. The assembly as recited in claim 1, wherein:

said first member comprising a rod element; and said second member comprising a slidable element annularly disposed at least in part about said rod element;

wherein said slidable element displacing axially along said rod element upon activation of said actuator.

8. The assembly as recited in claim 7, wherein said assembly forming part of a mechanical press environment, and said slidable element operatively supporting a press drive component.

9. The assembly as recited in claim 1, wherein activation of said actuator occurs automatically in response to release of the connection between said first member and said second member.

10. In a combination comprising a first device and a second device arranged in releasable press fit engagement with one another, said first device being fixedly mounted and said second device being selectively movable, said combination further comprising:

a first means to selectively release, at least in part, the press fit engagement between said first device and said second device, said first means being hydraulicly actuated to achieve engagement release; and a second means to selectively cause relative linear movement between said first device and said second device, when release of the press fit engagement exists.

11. The combination as recited in claim 10, wherein said first means being operative further to restore the releasable press fit engagement between said first device and said second device, following relative movement between said first device and said second device.

12. The combination as recited in claim 10, wherein said first means further comprises:

a pressure means to selectively pressurize an interface defined between said first device and said second device.

13. The combination as recited in claim 12, wherein said pressure means further comprises:

a source of selectively variable hydraulic pressure.

14. The combination as recited in claim 13, wherein said pressure means further comprises:

at least one fluid passageway formed in at least one of said first device and said second device, each fluid passageway arranged to enable fluid communication with said interface.

15. The combination as recited in claim 12, wherein said pressure means being operative to perform at least one of selectively applying hydraulic pressure to said interface to enable release of the press fit engagement, and selectively withdrawing hydraulic pressure from said interface to enable restoration of the releasable press fit engagement.

16. The combination as recited in claim 10, wherein said second means further comprises:

a control apparatus to automatically adjust the relative position of said first device and said second device, in response to release of the press fit engagement.

17. The combination as recited in claim 10, wherein:

said first device comprising a rod member; and said second device comprising a slidable member annularly disposed at least in part about said rod member;

wherein said slidable member moving axially along said rod member upon activation of said second means.

18. An assembly, comprising:

a housing;

a support member mounted fixedly, said support member being fixed to said housing;

a movable member releasably connected to said support member;

a mechanism to selectively release the connection between said movable member and said support member, said mechanism being hydraulicly actuated to achieve connection release; and an actuator to selectively linearly move said movable member relative to said support member, while said movable member being operatively released from said support member.

19. The assembly as recited in claim 18, wherein the releasable connection between said support member and said movable member being defined by a selectively-releasable press fit engagement therebetween.

20. The assembly as recited in claim 18, wherein said mechanism being operative further to selectively restore the releasable connection between said movable member and said support member, following movement of said movable member relative to said support member.

21. The assembly as recited in claim 18, wherein said mechanism being operative to selectively pressurize an interface defined between said support member and said movable member.

22. The assembly as recited in claim 21, wherein said mechanism further comprises:

at least one fluid passageway formed in at least one of said support member and said movable member, each fluid passageway being arranged to enable fluid communication with said interface.

23. The assembly as recited in claim 21, wherein said mechanism being operative to admit pressurized fluid into said interface to enable release of the connection between said movable member and said support member, and being operative further to remove pressurized fluid from said interface to enable restoration of the releasable connection between said movable member and said support member.

24. The assembly as recited in claim 18, wherein said actuator further comprises:

a threaded member operatively associated with said movable member, said threaded member being arranged in adjustable threading engagement with a threaded surface formed in said movable member; and a device to activate said threaded member.

25. The assembly as recited in claim 24, wherein said device further comprises:

a controllable motor-gear combination operatively coupled to said threaded member.

26. The assembly as recited in claim 18, wherein:

said support member comprising a rod element; and said movable member comprising a slidable element annularly disposed at least in part about said rod element;

wherein said slidable element displacing axially along said rod element upon activation of said actuator.

27. An assembly, comprising:

a housing;

a carriage member mounted fixedly. said carriage member being fixed to said housing;

a slidable clamping device arranged in releasable clamping relationship to said carriage member, an interface being defined between said carriage member and said clamping device;

a mechanism to selectively release the clamping relationship between said clamping device and said carriage member, said mechanism being hydraulicly actuated to achieve release of the clamping relationship; and a means to selectively move said clamping device relative to said carriage member, while said clamping device being released from said carriage member.

28. The assembly as recited in claim 27, wherein the releasable clamping relationship between said carriage member and said clamping device being defined by a press fit connection therebetween.

29. The assembly as recited in claim 27, wherein said mechanism being operative further to selectively restore the releasable clamping relationship between said clamping device and said carriage member, following movement of said clamping device relative to said carriage member.

30. The assembly as recited in claim 27, wherein said mechanism being operative to selectively pressurize said interface.

31. The assembly as recited in claim 27, wherein said mechanism being operative to perform at least one of selectively applying hydraulic pressure to said interface to enable release of said clamping device from said carriage member, and selectively withdrawing hydraulic pressure from said interface to enable restoration of the releasable clamping relationship between said clamping device and said carriage member.

32. The assembly as recited in claim 27, wherein said movement means further comprises:

an actuator to displace said clamping device along an axis of said carriage member.

33. An assembly, comprising:

a housing;

a rod member fixedly mounted, said rod member being fixed to said housing;

a slidable member annularly disposed at least in part about said rod member and defining an interface therewith, said slidable member being arranged in releasable press fit connection with said rod member;

a mechanism to selectively release, at least in part, the press fit connection between said slidable member and said rod member, said mechanism being hydraulicly actuated to achieve connection release; and a controller to selectively move said slidable member relative to said rod member, following release of said slidable member from said rod member.

34. The assembly as recited in claim 33, wherein said mechanism being operative further to selectively restore the releasable press fit connection between said slidable member and said rod member, following movement of said slidable member relative to said rod member.

35. The assembly as recited in claim 33, wherein said mechanism being operative to selectively pressurize said interface.

36. The assembly as recited in claim 33, wherein said mechanism being operative to perform at least one of selectively applying hydraulic pressure to said interface to enable release of the press fit connection between said slidable member and said rod member, and selectively withdrawing hydraulic pressure from said interface to enable restoration of the releasable press fit connection between said slidable member and said rod member.

37. The assembly as recited in claim 33, wherein said controller being operative to axially displace said slidable member along said rod member.

38. The assembly as recited in claim 33, wherein said slidable member operatively supporting a drive device of a mechanical press.

* * * * *